United States Patent [19]

Adams, Jr.

[11] Patent Number: 4,830,266

[45] Date of Patent: May 16, 1989

[54] METHOD OF PRODUCING WELD METAL TUBING EMPOYING A REUSABLE MANDREL

[75] Inventor: William T. Adams, Jr., Birmingham, Ala.

[73] Assignee: American Cast Iron Pipe Company, Birmingham, Ala.

[21] Appl. No.: 187,977

[22] Filed: Apr. 29, 1988

[51] Int. Cl.$^4$ ................ B23K 31/02; B23K 35/24
[52] U.S. Cl. .................... 228/231; 228/119; 228/228; 219/76.15
[58] Field of Search ............ 228/228, 238, 127, 119, 228/191, 231; 219/76.15 76.14, 76.1

[56] References Cited

U.S. PATENT DOCUMENTS

| | | | |
|---|---|---|---|
| 2,813,190 | 11/1957 | Felmly | 219/76.14 |
| 2,947,078 | 8/1960 | Pflumm | 228/127 |
| 3,481,024 | 12/1969 | Bunn | 228/127 |
| 3,611,541 | 10/1971 | Garrett | 219/76.14 |
| 4,097,711 | 6/1978 | Banerjee | 219/76.15 |
| 4,660,756 | 4/1987 | Geisseler | 219/76.1 |

Primary Examiner—Nicholas P. Godici
Assistant Examiner—Michael William Starkweather
Attorney, Agent, or Firm—Kerkam, Stowell, Kondracki & Clarke

[57] ABSTRACT

A method of producing substantially distortion-free weld metal tubing wherein a mandrel and a thin metal layer covering the mandrel are used to provide structural support for a starter tube while a weld metal is being deposited on the exterior surface of the starter tube to a desired thickness. The material used for the thin metal layer is selected to have a lower melting temperature than that of the mandrel, starter tube and weld metal, and after the weld metal deposit process is completed, the entire assembly is heated to a temperature in excess of the melting temperature of the thin metal layer, the molten material is flowed out from between the mandrel and the starter tube, thereby facilitating extraction of the mandrel from the weld metal tubing.

10 Claims, 1 Drawing Sheet

METHOD OF PRODUCING WELD METAL TUBING EMPOYING A REUSABLE MANDREL

BACKGROUND OF THE INVENTION

1. Field of the Invention

The present invention is directed to a method of producing weld metal tubing employing a reusable mandrel, and the tubing produced by said method.

2. Background of the Invention

Heavy or thick-walled tubing or pipe finds various uses in several industries. One approach to manufacturing such thick-walled tubing is by a process involving depositing a weld metal onto an exterior surface of a thin-walled starter tube. The tubing produced by this weld metal buildup is frequently referred to as weld metal tubing.

Weld metal tubing is conventionally produced by forming a flat steel sheet or plate into a cylindrical shape which serves as a starter tube. The tube wall thickness of the starter tube is, therefore, substantially the thickness of the flat plate from which it was formed. The tube wall thickness is then increased by depositing or overlaying a weld metal onto the exterior surface, thereby "building up" the outside diameter (and wall thickness) of the tube.

The thick-walled tubing produced in this manner is not fully satisfactory for use in all applications because the weld metal buildup process leaves distortions in the final product. The heat generated in the weld metal buildup process and the subsequent cooling of the weld metal from its solidus temperature to a weld interpass temperature creates in the tube diametrical shrinkage, surface distortion, bowing along the length of the tube, and longitudinal shrinkage of the tube.

These distortions imparted by the process are undesirable and in some applications render the tubing unusable. The presence of distortion is thus a limiting factor in the types of applications for which the tubing could be used.

One use envisioned for a thick-walled tubing produced by weld metal buildup is as a low-cost alternative to, or replacement for, more expensively produced molds used for centrifugal casting of pipe. However, because the interior surface of the weld metal tubing would serve as the form for the exterior wall of the cast pipe, the surface is required to be substantially free from distortion.

Substantially distortion-free weld metal tubing may be achieved by a process wherein the weld metal is deposited in thickness greater than the desired finished thickness, and subsequently machining the interior and/or exterior surface of the tubing to restore the roundness and arrive at a finished product shape. This technique possesses major disadvantages in that additional weld metal material is required, and an additional, highly time consuming machining step is introduced. The cost and increased time to produce such tubing presents significant disadvantages.

Mandrels have been used heretofore to provide a surface against which materials can be formed. The mandrel is used to assist in shaping a product, in many instances to take on the contour of the mandrel. A standard mandrel of this type would not, however, provide a solution to the distortion problems in the manufacture of weld metal tubing. A cylindrically shaped mandrel could indeed provide a true surface over which to form a section of weld metal tubing, however the diametrical shrinkage experienced when the heating and subsequent cooling takes place in depositing the weld metal would create a substantial interference fit between the tubing and the mandrel. This would make removal of the mandrel very difficult, if not impossible, without employing destructive measures.

It is therefore a principal object of the present invention to provide a method for consistently and repeatedly producing weld metal tubing which is relatively free of distortion.

It is a further object of the present invention to provide a method of producing thick-walled tubing in a more cost-effective manner than previously employed.

It is further object of the present invention to provide a substantially distortion-free weld metal tubing product made by the method of the present invention which is substantially free from distortion.

SUMMARY OF THE INVENTION

The above and other objects of the present invention are accomplished by a method employing a reusable mandrel in producing weld metal tubing.

As previously discussed, the use of a standard solid mandrel to provide support for the interior of a starter tube during the production of a weld metal tubing has one serious drawback; the inability to remove the mandrel due to the interference fit generated. In the method of the present invention this problem is overcome by providing a mandrel system which is designed to take advantage of differences in melting temperatures and stress relief temperatures of various metals.

In the present invention, the support mandrel provided has an outer diameter which is not equal to, but rather has a smaller diameter than the desired final inner diameter of the weld metal tubing. The exterior surface of this mandrel is covered with a thin layer of a metal which has a melting temperature which is lower than the melting temperature of the starter tube and the weld metal which is to be overlayed on the starter tube. The outer diameter of this covering is to be substantially equal to the desired inner diameter of the finished product.

The mandrel system comprising the mandrel and thin metal layer cover is positioned in the interior of the starter tube, and the weld metal deposit or overlay process is commenced. The weld metal is deposited around the circumference and along the length of the starter tube until a desired predetermined thickness of the tubing is reached. The weld metal tubing thus produced will form an interference fit with the mandrel system via the intermediate layer covering the mandrel.

Removal of the mandrel from the tubing interior is effected through heating the mandrel and tubing assembly to a temperature above the melting temperature of the intermediate thin metal layer covering the exterior surface of the mandrel. The molten metal is flowed out from the space between the tubing and the mandrel, providing a clearance space for removal of the mandrel from the tubing.

The mandrel with its thin layer of metal covering the exterior surface thus provides the required support or backing to prevent distortion, such as tube bowing, and to limit shrinkage of the tube during the cooling period after a weld metal is deposited. At the same time, the mandrel and thin metal layer provide a solution to the problem of removing the mandrel from the tube due to the interference fit created therebetween by melting away the thin metal layer without disturbing the physical integrity of the weld metal tubing or the mandrel.

The mandrel may this be reused in producing additional weld metal tubing. The exterior surface of the mandrel need only be covered with a new thin layer of metal, whereupon it may be introduced into the interior of a new starter tube, and the weld metal buildup subsequently conducted.

While the method employing the reusable mandrel in producing weld metal tubing is advantageously used to produce tubing having a thickness of at least one inch, it may also be employed to produce tubing of lesser thicknesses.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment of the present invention taken in conjunction with the accompanying drawings, wherein like reference characters represent like parts throughout the several views, and wherein.

DESCRIPTION OF THE PREFERRED EMBODIMENT

Figure 1:
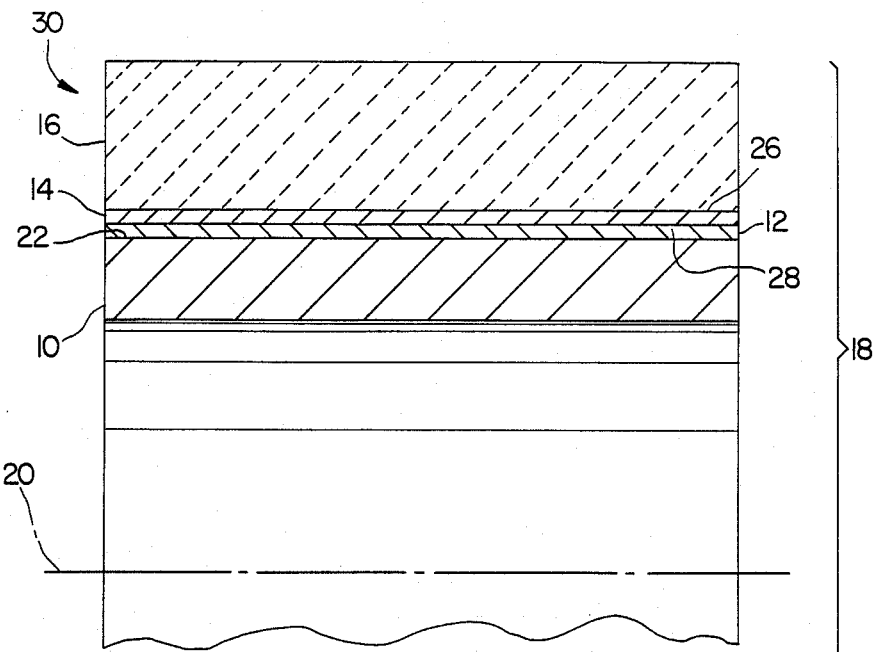
FIG. 1 represents a cross-section of an upper portion of an assembly comprising a mandrel, a thin metal layer, a starter tube, and a weld metal buildup layer.

Referring initially to FIG. 1, the method for producing a thick-walled weld metal tubing and the tubing thus produced will be described according to a preferred embodiment of the present invention. The method, briefly stated, comprises providing a reusable cylindrical mandrel 10, covering the mandrel with a thin layer 12 of metal, depicted in FIG. 1 as a thin sheet, placing the covered mandrel in the interior of a starter tube 14, depositing a layer 16 of weld metal onto the exterior surface of the starter tube, heating the entire assembly 18 to a temperature higher than the melting temperature of the thin metal layer 12 covering the mandrel 10, flowing the molten metal from between the mandrel 10 and the starter tube 14, and removing the mandrel 10 from the center of the starter tube 14.

In the partial longitudinal cross-section view of FIG. 1, it can be seen that the mandrel 10 provided is of hollow cylindrical shape. The mandrel 10 is symmetrical about centerline or longitudinal axis 20. A relatively heavy-walled hollow cylindrical shape is a preferred embodiment for producing large diameter tubing, but it would also be possible to use a solid cylindrical shape for the mandrel, if desired.

The thin metal layer, depicted in FIG. 1 as a sheet of metal, is wrapped around the exterior surface 22 of the mandrel 10. A small diameter metal wire 24 (FIG. 2) tightly coiled about the mandrel 10 may alternatively be used to form the thin metal layer 12. The material selected for the thin metal layer 12 is preferably aluminum when steel weld metal tubing is to be produced, for reasons which will be discussed in more detail later, but in any event must have a melting temperature less than that of the mandrel and that of the starter tube 14 and weld metal layer 16. The thin metal layer 12 may thus also be referred to as a low melting point layer.

In the preferred method, the starter tube 14 is rolled from a thin metal plate, generally on the order of 0.25 inches thick, and the edges of the plate are seam welded to make the tube 14 continuous. The inner diameter of this starter tube 14 is preferably slightly greater than the external diameter of the low melting point layer 12, thereby producing a gap "g" (FIG. 2) when the covered mandrel is initially inserted in the starter tube 14. During the weld metal buildup step of the method according to the present invention, the cooling of the molten weld metal from the solidus temperature to a weld interpass temperature, will cause starter tube 14 to shrink diametrically into contact with low melting point layer 12, and result in the structure depicted in FIG. 1. The term "weld interpass temperature" is used to describe the temperature to which the entire assembly 18 is heated as a result of the weld deposit process. The term "interpass" signifies that the weld metal layer 16 may actually be formed using several "passes" in the overlay process, in the event that more than one pass is required to deposit a sufficient thickness of weld metal.

It has been found in experiments conducted in accordance with the present invention that the provision for gap "g" which is, in effect, a shrinkage allowance, is desirable to prevent the starter tube 14 from cracking as the molten metal is being deposited on the exterior surface 26 of the tube 14. Where a steel starter tube of 0.25 inch thickness is used, a difference in diameters leaving a gap "g" of 0.028 inches per inch of tube diameter is sufficient allowance to substantially prevent cracking. Thus, if the outer diameter of the low melting point layer is 36 inches, the inner diameter of the starter tube would preferably be approximately 37 inches, and the dimension "g" in FIG. 2 would be 0.5 inches.

It has been determined in accordance with the present invention that where a starter tube 14 has a thickness greater than 0.25 inches, a sufficient gap "g" may be less than 0.028 inches per inch of diameter, but where the starter tube 14 has a thickness less than 0.25 inches, a larger gap may be required.

Figure 2:
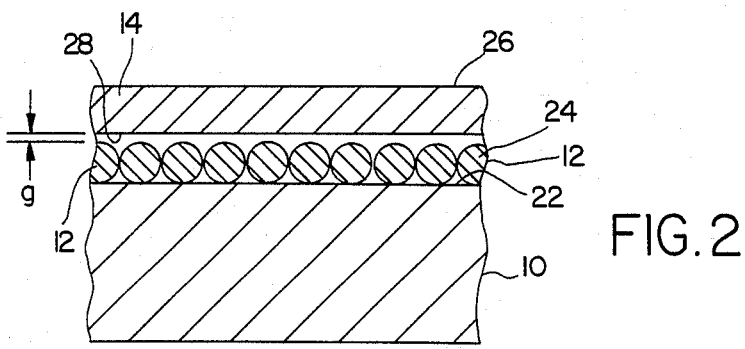
FIG. 2 represents a cross-section of a mandrel employing an alternate embodiment of the thin metal layer.

In order to perform the weld metal buildup of the starter tube 14, the mandrel 10 covered by low melting point layer 12 is disposed in the interior of starter tube 14, as represented by the partial cross-section of FIG. 2. The deposit of molten metal onto the exterior surface 26 of starter tube 14 may be performed by conventional weld overlay-type processes. Generally, it is desirable to deposit the weld metal evenly over the entire exterior peripheral surface 26 to build up the thickness of the starter tube 14 to a substantially constant thickness. Depending on the desired end product wall thickness, the weld metal may be deposited in one or more passes.

The molten metal, once cooled, forms the layer represented by numeral 16 in FIG. 1. This weld metal layer 16 is fused to starter tube 14 by virtue of the weld deposit process, thereby forming an integral section of thick-walled weld metal tubing. The wall thickness of such tubing will generally range from one to several inches. Large diameter tubing advantageously produced using the method of the present invention can range from several inches in diameter to several feet in diameter.

As the weld metal layer 16 is being deposited upon the exterior surface 26 of starter tube 14, and begins to cool and shrink, starter tube 14 is forced to contract diametrically into contact with low melting point layer 12 as shown in FIG. 1, whereupon layer 12 and mandrel 10 provide a backing or support surface for the inner surface 28 of the starter tube 14. While this support or backing is desirable in substantially eliminating the subsequent distortion (e.g. bowing, warping) which would normally occur in the weld metal tubing being produced, the contact between the low melting point layer 12 and starter tube 14 also creates a substantial interference fit between these components. The contraction of the starter tube 14 will continue generally to the point wherein the overall thickness of the starter tube 14 and weld metal layer 16 reaches one inch in thickness.

While removing a mandrel without using destructive techniques after this process would normally be a very difficult, if not impossible, task, the step in the method of the present invention of applying the low melting point layer 12 to the exterior surface 22 of the mandrel permits a further step which facilitates removal of the mandrel for reuse. Once the weld metal deposit step is completed, the entire assembly 18 comprising mandrel 10, low melting point layer 12, starter tube 14, and weld metal layer 16, is heated, preferably in an oven, to a temperature higher than the melting point of the low melting point layer 12. Once molten, this metal is flowed out from between the mandrel 10 and the weld metal tubing 30. The removal of this layer 12 leaves a sufficiently wide gap such that the mandrel 10 can be easily removed. The mandrel 10 may then be recoated with a thin metal layer 12 and reused in fabricating subsequent sections of weld metal tubing.

This method is advantageously used to produce weld metal tubing 30 having a relatively thick wall, ranging from one to several inches in thickness, however the process is not limited to this thickness range and may be employed to produce weld metal tubing of greater or lesser thicknesses. The weld metal tubing thus produced is substantially free from distortion. In addition, as the compositions of the starter tube 14 and weld metal layer 16 need not be the same, special two-alloy tubing may be produced in substantially distortion-free sections.

It must be recognized that, in the process of the present invention, prior to the step of selecting and applying the thin metal layer 12 onto the exterior surface 22 of the mandrel 10, the materials to be used for the mandrel 10, starter tube 14, and weld metal layer 16 must be selected or predetermined. These materials must have a higher melting temperature than that of thin metal layer 12, as these components must remain structurally intact during the post-weld heating steps, wherein the thin metal layer 12 is melted. It is to also be recognized that, although the weld metal is to be deposited in a molten state, the entire assembly 18 is not heated to the weld metal temperature during the weld deposit step of the process. The immediate exterior surface of the starter tube 14 will be the only area exposed to such a temperature. Heat dissipation into the surrounding atmosphere and into the assembly 18 itself heat the assembly only to the aforementioned interpass temperature. Although this interpass temperature may vary due to the specific choice of materials and the speed at which the weld depositing is performed, in all instances the interpass temperature will remain below the melting temperatures of all materials used.

Several specific measures may be taken to maximize or optimize the consistent production of distortion-free tubing 30. It should be recognized that even where a mandrel is used as a backing or support surface in the weld metal buildup process, the contraction of the tubing caused by the cooling and shrinking of the weld metal leaves residual or "locked-in" stresses in the weld metal tubing 30 once the mandrel restricts further shrinkage.

Figure 3:
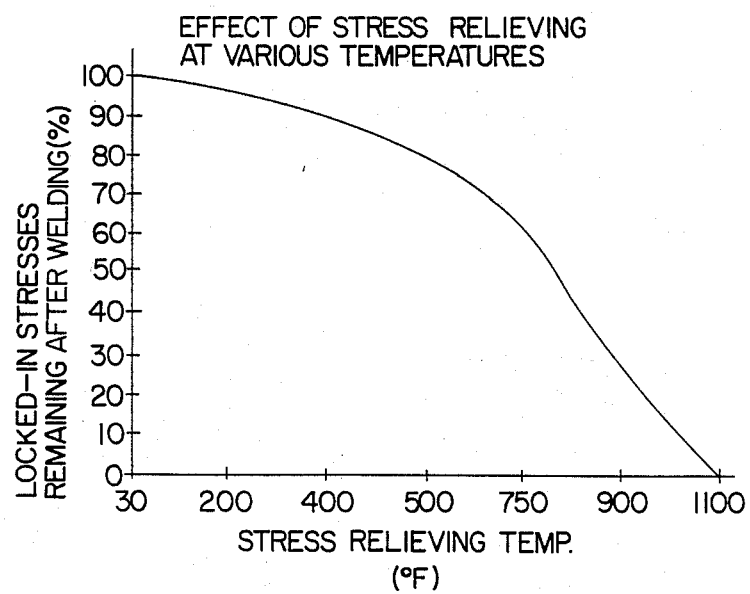
FIG. 3 is a graph representing the change in the percentage of locked-in stress remaining in the tube from the weld buildup process as the stress relief temperature is varied.

FIG. 3 is a graph showing the effects of stress relief at different temperatures on the percentage of locked-in stress in steel weld metal tubing 30 produced according to the method of the present invention. As a general rule, the greater the amount of locked-in stress remaining, the greater the chances are of the tubing evidencing distortion once the support mandrel 10 is removed. It can be seen that these locked in stresses are nearly entirely eliminated in steel tubing at a stress relief temperature of about 1100° F.

The step in the method of the present invention wherein the assembly is heated to a temperature at or above the melting temperature of the thin metal layer 12 will serve also as a stress relief process for the weld metal tubing 30. As the temperature is raised, the stresses in the tubing are relieved in accordance with the FIG. 3 graph.

Aluminum is advantageously used as the material for the thin metal layer or low melting point layer 12 covering the mandrel when steel weld metal tubing 100 is produced. Pure aluminum has a melting temperature of 1220° F., and most commercial aluminum alloys have a melting temperature slightly lower than this. The aluminum will therefore not be melted at the temperature of complete stress relief (1100° F., FIG. 3) and therefore continues to support the weld metal tubing in substantially distortion-free condition until all distortion-causing stresses are removed. Only when the temperature is raised an additional 100° F, to the 1200° F., range, will the aluminum be melted and capable of being flowed out. Thus, substantially distortion-free weld metal tubing 30, comprising the starter tube 14 and weld metal layer 16 is produced for use in various applications including molds for centrifugal casting of pipe.

The above description of the method and product produced by the method according to the preferred embodiment of the present invention is intended for illustrative purposes only. Various modifications and adaptations may become apparent to those skilled in the art. Accordingly, the scope of the present invention is to be determined by reference to the appended claims.

What is claimed is:
1. A method for producing weld metal tubing comprising the steps of:
   (a) selecting a cylindrical mandrel having a predetermined melting temperature;
   (b) applying a metal to form a layer covering substantially an entire exterior surface of said mandrel, said metal layer having a predetermined melting temperature lower than the melting temperature of said mandrel;
   (c) forming a starter tube of a metal having a predetermined melting temperature higher than said predetermined melting temperature of said metal layer covering said mandrel;
   (d) inserting said mandrel covered with said metal layer into an interior portion of said starter tube, said starter tube having an inner diameter larger than an outer diameter of said metal layer covering said mandrel, thereby leaving a gap between said starter tube and said covered mandrel allowing said starter tube to contract by a predetermined amount;

(e) depositing weld metal onto an exterior surface of said starter tube to form a layer having a substantially even thickness over the entire exterior surface, said weld metal temperature having a melting temperature higher than said melting temperature of said thin metal layer;

(f) heating an assembly comprising said mandrel, said thin metal layer, said starter tube and said weld metal layer to a temperature at or above said melting temperature of said thin metal layer and below said melting temperatures of said mandrel, said starter tube and said weld metal layer;

(g) flowing the molten metal of said thin metal layer from between said mandrel and said starter tube; and (h) removing said mandrel from said interior of said starter tube.

2. The method as defined in claim 1 wherein the starter tube is made of a steel alloy.

3. The method as defined in claim 2 wherein the weld metal is a steel alloy.

4. The method as defined in claim 3 wherein the metal layer covering said mandrel comprises aluminum.

5. The method as defined in claim 4 wherein said metal layer comprising aluminum has a melting temperature on the order of 1200° F., and step (f) of the method further comprises heating the assembly to said melting temperature whereby residual locked-in stresses in said starter tube and said weld metal are substantially completely relieved prior to the melting and flowing of said metal layer.

6. The method as defined in claim 1 wherein the metal layer covering said mandrel is a sheet of aluminum having a thickness on the order of 0.25 inch.

7. The method as defined in claim 1 wherein the metal layer covering said mandrel is an aluminum wire coiled around the mandrel, said wire having a diameter on the order of 0.25 inch.

8. The method as defined in claim 1 wherein step (b) further comprises coiling a metal wire around said exterior surface of said mandrel.

9. The method as defined in claim 1 wherein step (b) further comprises wrapping a thin sheet of metal having thickness on the order of 0.25 inches around the exterior surface of said mandrel.

10. A process for manufacturing weld metal tubing comprising the steps of:

(a) selecting a support mandrel made of a material having a predetermined melting temperature;

(b) selecting a mandrel covering material having a predetermined melting temperature lower than said melting temperature of said mandrel;

(c) covering an exterior surface of said mandrel with a thin layer of said mandrel-covering material;

(d) forming a starter tube of a material having a predetermined melting temperature greater than said melting temperature of said mandrel-covering material;

(e) inserting said mandrel covered with said mandrel-covering material into an interior of said starter tube;

(f) overlaying an exterior surface of said starter tube with a molten weld metal to form a layer of substantially equal thickness over the entire exterior surface;

(g) heating said mandrel, said mandrel-covering material, and said weld metal tubing comprising said starter tube and said weld metal layer, to a temperature above the melting temperature of said mandrel-covering material, thereby rendering said mandrel covering material in a molten state;

(h) flowing said molten material from between said mandrel and said weld metal tubing;

(i) extracting said mandrel from said interior of said weld metal tubing.

* * * * *

UNITED STATES PATENT AND TRADEMARK OFFICE
CERTIFICATE OF CORRECTION

PATENT NO. : 4,830,266

DATED : May 16, 1989

INVENTOR(S) : William T. Adams, Jr.

It is certified that error appears in the above-identified patent and that said Letters Patent is hereby corrected as shown below:

On the title page and Column 1, lines 1 and 2, title of invention should read -- METHOD OF PRODUCING WELD METAL TUBING EMPLOYING A REUSABLE MANDREL --.

Signed and Sealed this

Twenty-seventh Day of February, 1990

*Attest:*

JEFFREY M. SAMUELS

*Attesting Officer*   *Acting Commissioner of Patents and Trademarks*